United States Patent [19]

Tam

[11] Patent Number: 5,077,675
[45] Date of Patent: Dec. 31, 1991

[54] POWER-ON-CONCURRENT MAINTENANCE

[75] Inventor: Kam T. Tam, San Jose, Calif.

[73] Assignee: Amdahl Corporation, Sunnyvale, Calif.

[21] Appl. No.: 416,866

[22] Filed: Oct. 4, 1989

[51] Int. Cl.$^5$ .............................................. H02H 7/20
[52] U.S. Cl. ...................................... 364/480; 361/9; 361/58
[58] Field of Search ...................... 364/480, 492, 493; 340/660, 662; 439/821, 823; 361/9, 58, 111

[56] References Cited

U.S. PATENT DOCUMENTS

| | | | |
|---|---|---|---|
| 4,245,270 | 1/1981 | Busby | 361/9 |
| 4,454,552 | 6/1984 | Barnes et al. | 361/58 |
| 4,507,697 | 3/1985 | Ozil et al. | 361/01 |

*Primary Examiner*—Thomas G. Black
*Attorney, Agent, or Firm*—Fliesler, Dubb, Meyer & Lovejoy

[57] ABSTRACT

A power sequencer for connecting a system to an electrical power supply without powering down the system and without damage to the system or the power supply. A plurality of sequentially engageable contacts are coupled to the power supply for receiving power signals. The contacts are spatially positioned to toggle in a predetermined sequence during engagement. A controller is coupled to the contacts, for supplying a terminal signal to the load in response to the predetermined sequence of toggling of the contacts and in response to the power signals. The controller has a control circuit for generating a control signal which varies in response to the sequence, and a regulator, coupled to the control circuit, for regulating the terminal signal in response to the control signal.

1 Claim, 3 Drawing Sheets

FIG.—1

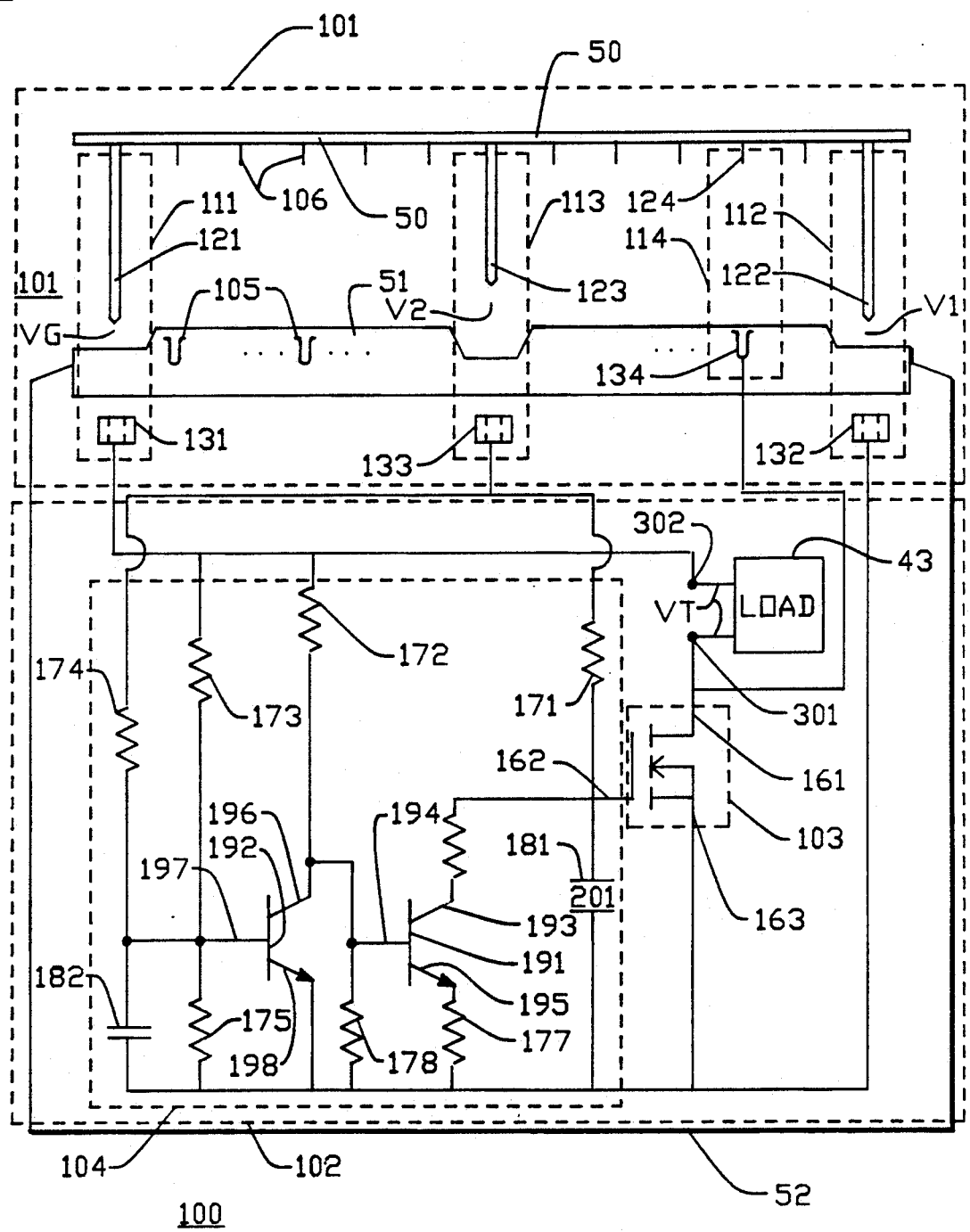
FIG.—6

POWER-ON-CONCURRENT MAINTENANCE

BACKGROUND OF THE INVENTION

1. Field of the Invention

The present invention relates generally to an apparatus and method for controlling the power to components while installing or removing the components for an electronic device while the electronic device is powered.

2. Description of the Related Art

Many electronic devices, such as computers, are equipped with expansion card slots which enable the devices' hardware to be enhanced by insertion of cards which contain additional memory, processors, or other specialized items. Insertion and removal of such cards, whether for the purpose of performing repairs to the cards or merely the purpose of changing the hardware configuration of the computer, generally require that the computer be powered down and turned off during the maintenance period.

However, many computer uses require that the computer remain running continuously, or at least for extended periods of time. In such situations, the computer must not be powered down simply to change the compliment of cards. When a card is inserted or withdrawn while the computer is powered and running, the sharp and sudden change of current through the inductive mother-board power path will induce voltage spikes, which will appear at both the card and the computer. These spikes may often be large enough to cause loss of data, incorrect program execution, or even permanent damage to the delicate hardware components themselves.

Prior attempts to enable cards to be inserted or withdrawn in "power-on" circumstances have proved less than satisfactory. One known technique is the "umbilical cord" method. A typical card is powered via connecting pins at its attaching edge, which engage complimentary members of the card slot's connector device. To use the umbilical cord, each card is adapted with a plug which is wired in parallel with the connecting pins, and before the card is inserted, a technician attaches an umbilical cord to the card. Power can then be gradually brought up on the card via a control device in the umbilical cord, in a slow enough manner to avoid causing spikes. After the card is powered up, it can be inserted into the card slot and the umbilical cord removed.

However, this method leaves the computer's integrity wide open to technician error or neglect. If the technician forgets to attach the cord to the card, and inserts the card, spikes will result and may destroy the system. The technician may also neglect to adjust the umbilical cord's power control device before attaching the cord to the card, with similar results. Extraction of circuit cards from a live system also poses similar hazards.

Another known method involves the use of large, cumbersome, and expensive power control units at each card slot in the computer. Since the card slots themselves are provided with the spike avoidance devices, that method is wastefully expensive. Even unused card slots are equipped with the devices, so unneeded power control units must be purchased with the computer. Since the devices are large and powerconsuming, that method is also wasteful of electricity, as such a system will continually be ready to power up cards which may never be inserted. The addition of devices at the mother-board also substantially increases the impedance of the power path, with a corresponding increase in any spikes which do occur.

It is an object of the present invention to provide an apparatus and method of inserting and removing cards from a computer while the computer is running. It is a further object of the present invention to remove the possibility of human error or neglect, to ensure that spikes are automatically avoided when cards are inserted and withdrawn. It is still a further object to make the present invention neither wasteful nor expensive.

SUMMARY OF THE INVENTION

The present invention is an apparatus and method for connecting a load to, or extracting a load from, an electrical power supply, where the power supply provides a plurality of power signals. The apparatus has a plurality of sequentially engagable contacts, coupled to the power supply, for receiving the power signals. The contacts are spatially positioned to toggle in a predetermined sequence during movement. The apparatus also has a controller, coupled to the contacts, for supplying a terminal signal to the load in response to the predetermined sequence of toggling of the contacts and in response to the power signals.

The controller has a control circuit for generating a control signal which varies in response to the sequence, and a regulator, coupled to the control circuit means, for regulating the terminal signal in response to the control signal.

Each of the contacts includes a pin coupled to an expansion slot in the electronic device, and a socket coupled to an expansion card. The pin of a secondary contact is shorter than the pins of reference and primary contacts, and the sockets of the reference, primary, and secondary contacts are fixed to the card in a substantially linear manner.

As the card is inserted into the card slot, the sockets engage the pins in the predetermined sequence of the ordered states of: a start logic state when none of the contacts has yet engaged, a first logic state after the reference and primary contacts are engaged but before the secondary contact engages, a second logic state when the reference, primary, and secondary contacts are all engaged. As the card is then withdrawn, the sockets disengage the pins in a further sequence of: a fifth logic state after the secondary contact disengages but while the reference and primary contacts remain engaged, and an end logic state after the secondary, primary, and reference contacts have all disengaged.

These and other advantages, features, and objects of the present invention will be apparent from the following description in conjunction with the drawings.

BRIEF DESCRIPTION OF THE DRAWINGS

FIG. 6 is a schematic diagram of the controller circuitry of the present invention, showing the circuitry coupled to a load and to the connector of FIGS. 1 and 2.

DETAILED DESCRIPTION OF THE PREFERRED EMBODIMENT

Figure 1:
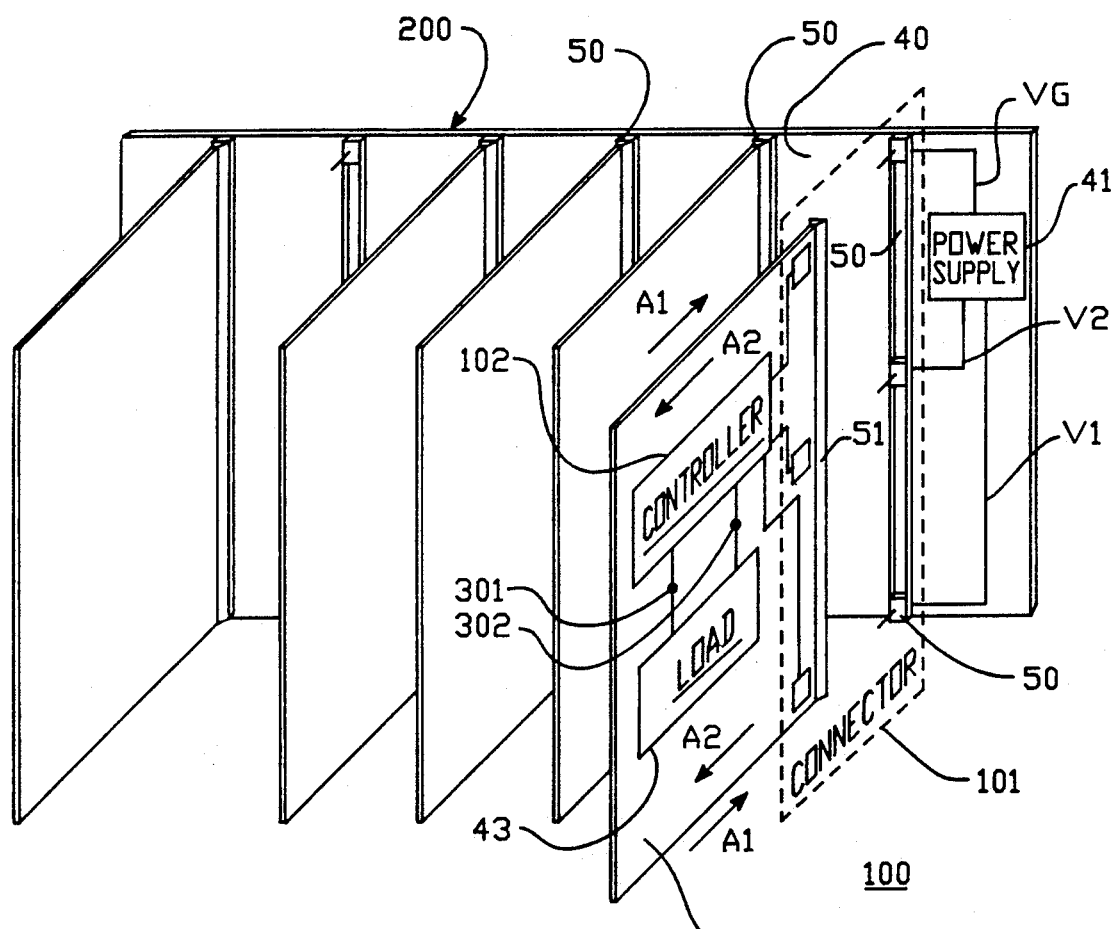
FIG. 1 depicts a computer mother-board with expansion card slots coupled to a power supply, and a card having a voltage control circuit coupled to a load circuit, the mother-board and card being equipped with the connector of the present invention.

FIG. 1 depicts a generalized view of the present invention, showing a daughter-board, or card 52, about to be engaged into an expansion card slot 50 which is part of a mother-board 40 in an electrical device such as a computer 200. The computer has a power supply 41 which provides a plurality of power signals VG, V1, and V2 to expansion card slots 50. The card 52 couples to the card slot 50 on connector 101, which provides the power signals VG, V1, and V2 to the signal controller 102 on the card 52. The signal controller 102 uses the power signals VG, V1, and V2 to power up a load circuit 43 as the card 52 is inserted into the card slot 50 with motion in the direction of arrow A1, and to power down the load circuit 43 as the card 52 is withdrawn with motion in the direction of arrow A2. The details of the load circuit 43 are not within the scope of this invention.

Figure 2:
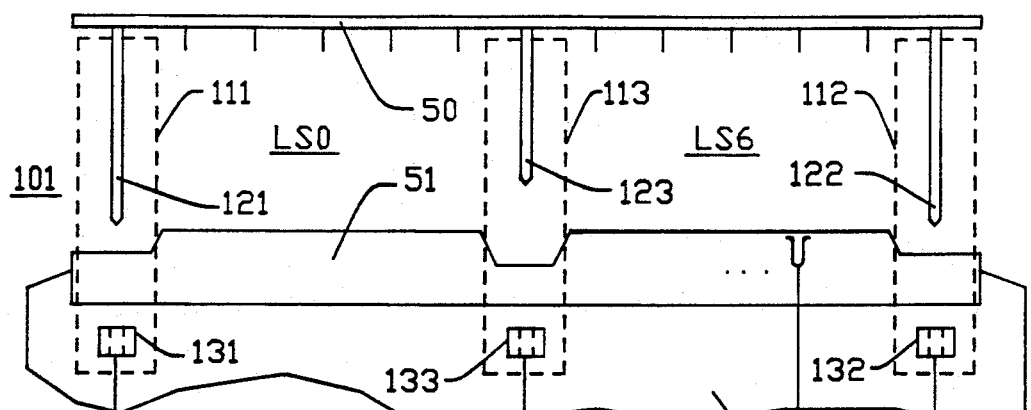
FIG. 2 shows the connector of the present invention in a start logic state existing before the card is inserted into the card slot, and an end logic state existing after the card is fully withdrawn from the card slot.

Referring now to FIG. 2, and to FIG. 6 for the duration of the Detailed Description, the card 52 is initially not attached to the card slot 50 at any point. The connector 101 is then in a start logic state LS0, where no electricity is available to the card 52. The connector 101 has a plurality of engagable contacts 111-113, each of which includes first and second engagable parts, such as a pin and a socket. Due to the spatial positioning of the pins 121-123 relative to the sockets 131-133, the contacts 111-113 will engage in a predetermined sequence, and will disengage in reverse sequence.

Figure 3:
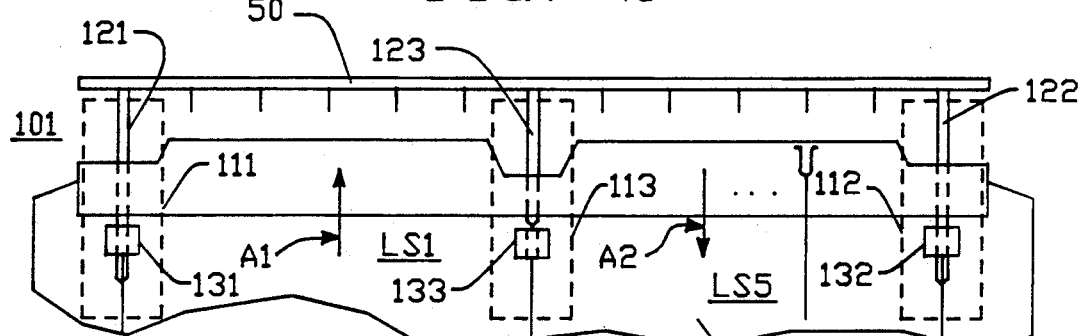
FIG. 3 shows the connector in a first logic state existing when the card is partially inserted into the card slot during insertion, and a fifth logic state existing when the card is nearly withdrawn from the card slot during removal.

As FIG. 3 shows, on insertion of the card 52, the parts of the ground (reference) contact 111 will make connection and the parts of the primary contact 112 will make connection, before the parts of the secondary contact 113 connect. This state is the first state LS1 in a predetermined engagement sequence of the connector 101. The reference and primary contacts 111 and 112 have logically "toggled" from a disengaged condition to an engaged condition. While contact means 111 is described as a ground contact providing a ground, it is understood that any signal or reference may be used as a ground reference.

In the preferred embodiment, the sequence is accomplished by forming ground contact 111 as a ground pin 121 and a ground socket 131, primary contact 112 as a primary pin 122 and a primary socket 132, and secondary contact 113 as a secondary pin 123 and a secondary socket 133, by fixing the sockets 131-133 to the card 52 in relatively linear fashion parallel to the slot adapter 51 of the card 52. Then, by making the primary pin 122 and the ground pin 121 longer than secondary pin 123, it is ensured that when the card 52 is inserted into the card slot 50, the ground contact 111 and primary contact 112 must engage while secondary contact 113 cannot yet reach. In the preferred embodiment, secondary pin 123 is 14.0 millimeters shorter than the ground and primary pins 121 and 122.

Ground contact 111 is used to provide the card 52 with a ground voltage reference VG, and primary contact 112 is used to provide the card 52 with a first voltage V1 which, in the preferred embodiment, is approximately −5.2 V, relative to the ground voltage reference VG. When logic state LS1 is reached, third and fifth resistor means 173 and 175 bias the second transistor means 192 to be off. In the preferred embodiment, third resistor 173 is an 8 kilo-ohm resistor, fifth resistor 175 is a 320 ohm resistor, and second transistor 192 is an n-p-n bipolar transistor.

Because second transistor 192 is off, current flowing from ground contact 111 will not pass through the collector 196 of second transistor 192, and must travel the path toward the base 194 of the first transistor means 191. The magnitude of eighth resistor means 178, 2 kilo-ohms in the preferred embodiment, causes a larger voltage drop than does seventh resistor means 177, only 200 ohms in the preferred embodiment. This causes first transistor 191 to be on. This all forces first capacitor means 181 to be uncharged. In the preferred embodiment, first capacitor means 181 is a 1.6 micro-farad capacitor, and second capacitor means 182 is a 0.1 micro-farad capacitor.

With first capacitor 181 uncharged and first transistor 191 on, control signal circuit 104 produces a first control signal (not shown), which turns regulator 103 off. Regulator 103 then provides no voltage to first terminal 301 relative to the ground voltage VG. Ground voltage VG is applied to second terminal 302 directly by ground contact 111. Therefore, the load 43, connected across the terminals 301 and 302, will still not have any current flowing through it.

As the card 52 is further inserted into the card slot 50 with motion A1, secondary contact 113 will eventually connect, when secondary pin 123 meets secondary socket 133. This is the second logic state LS2, shown in FIG. 4. When connector 101 enters second logic state LS2, fourth resistor means 174 pulls the base 197 of second transistor 192 high, which turns second transistor 192 on, allowing current to flow through the emitter 198 of second transistor 192. In the preferred embodiment, fourth resistor 174 is a 4.82 kilo-ohm resistor.

Because second transistor 192 has much less resistance than eighth resistor 178, current will tend to stop flowing into the base 194 of first transistor 191, which will shut first transistor 191 off. In the preferred embodiment, this will take place in a first period of time of roughly a few microseconds. With first transistor 191 off, the voltage potential between second voltage V2 and first voltage V1 will cause a charge 201 to build up on first capacitor 181. First resistor means 171 slows this process, however, so that in the preferred embodiment it takes a second period of time of roughly two milliseconds. The charging and discharging time is adjustable by varying the values of resistor 171 and capacitor 181. In the preferred embodiment, a first resistor 171 of 5 kilo-ohm resistance and capacitor 181 of 1.6 micro-farad capacitance are appropriate to cause this time delay.

At the beginning of this second period of time, no charge is on first capacitor 181, so current flows freely across first capacitor 181. But as charge 201 begins to build up, a voltage rises across the input of the regulator 103. This voltage constitutes a rising control signal (not shown). As more and more charge 201 builds up, the rising control signal becomes stronger and stronger, turning regulator means 103 on harder and harder. In the preferred embodiment, regulator 103 is a field effect transistor, and the control signals arrive at its gate 162, allowing power current to flow from the source 163 to the drain 161 of the field effect transistor 103.

The greater the current in regulator 103, the greater the terminal signal VT it applies to first terminal 301, until a second control signal (not shown) is achieved, which turns regulator 103 completely on, and terminal voltage VT substantially reaches first voltage V1. This gradual incrementation of the terminal voltage VT, and consequent gradual incrementation of current flow through the load 43, preclude the occurrence of voltage or current "spikes" on the card 52 or in the motherboard 40. A second time period of two milliseconds is sufficiently long to avoid spikes.

Figure 5:
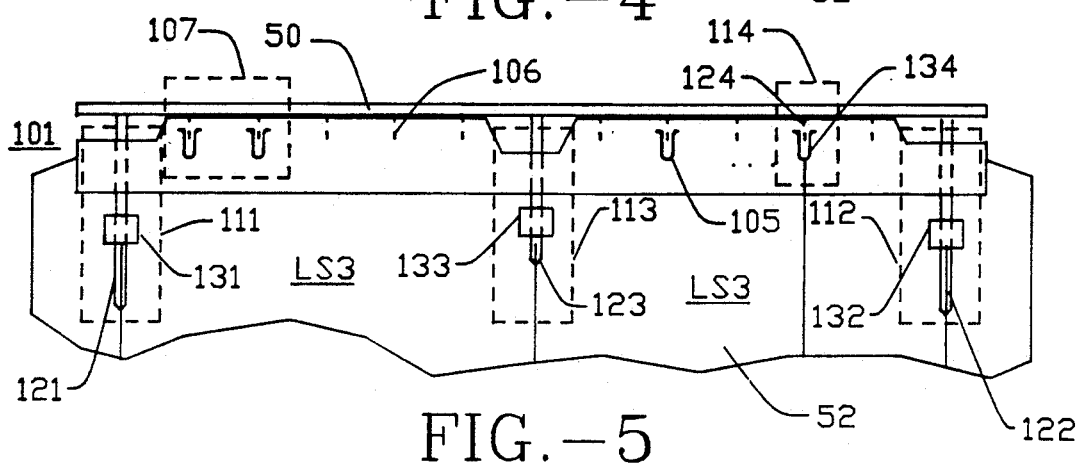
FIG. 5 shows the connector in a third logic state existing when the card is completely inserted into the card slot.

Finally, as shown in FIG. 5, the card 52 will become fully inserted into the card slot 50. Only then will the standard communication contacts 107 make connection. The communication contacts 107 are the typical means by which the card 52 and the computer 200 send message signals to each other.

By making secondary pin 113 long enough, relative to the communication pins 106, it will take more than two milliseconds to advance the card 52 into the card slot 50 from second logic state LS2 to third logic state LS3. Because signal controller 104 took only two milliseconds to power up the regulator 103 and consequently the load, the load will be fully powered and running by the time the communication contacts 107 connect.

Optionally, one or several of the communication pins 106 may be used as a final contact pin 124, and several corresponding communication sockets 105 may be used as a final contact socket 134. Final contact pin and socket 124 and 134 are then a final contact 114, which may be used to power the load 43 directly. Wiring the first terminal 301 directly to final contact 114 accomplishes two purposes. First, it enables the terminal voltage VT to be more accurately controlled, without a voltage drop across the regulator 103. Second, it will cause the regulator 103 to shut down, so power current will not flow through the regulator 103 even though control signal circuit 104 continues to send the second control signal.

In the preferred embodiment, the signal controller 102 will draw only about, 2 milli-amp of current once the regulator 103 is bypassed and shut down. This minimizes the current wasted by the present invention, reducing wear and tear, and reducing heat production of the card 52. Please note that the present invention may be practiced without this final contact 114 being established, by simply continuing to power the load via one or more regulators 103.

Figure 4:
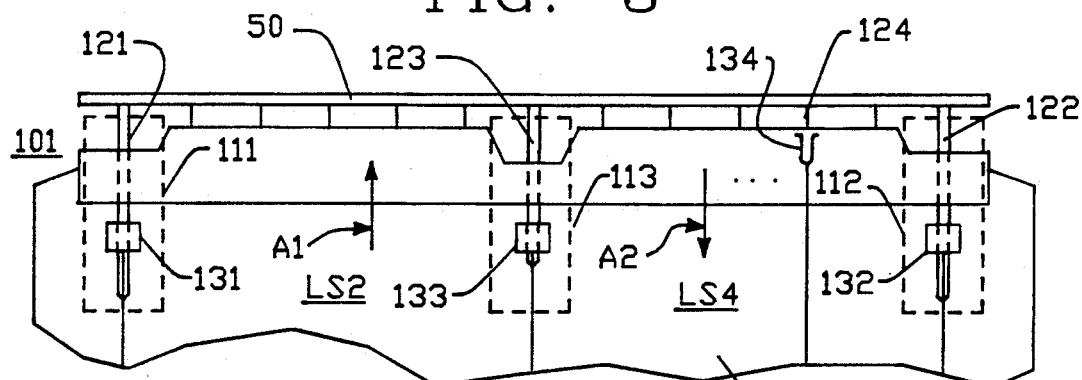
FIG. 4 shows the connector in a second logic state existing after the card is inserted farther into the card slot during insertion, and a fourth logic state existing when the card is partially withdrawn from the card slot during removal.

When the card 52 is withdrawn from the card slot 50 with motion in the direction of arrow A2, shown in FIG. 4, the power-up sequence is reversed and the contacts 111–114 will toggle back to their decoupled states. The power sequencer 100 enters a fourth logic state LS4 when the optional final contact 114 breaks connection. If the optional final contact 114 is used, the load 43 will again be powered via the regulator 103, but in any case the load 43 will continue to be powered by the signal controller 102. Note that fourth logic state LS4 is identical in appearance to second logic state LS2.

Then, FIG. 3 shows that when the secondary contact 113 breaks connection, the connector 101 enters a fifth logic state LS5, similar to the first logic state LS1. Then, the voltage divider consisting of third and fifth resistors 173 and 175 will bias second transistor 192 to be off within a few microseconds. With second transistor 192 off, first transistor 191 turns on again, and the charge 201 on the first capacitor 181 discharges through the collector 193 of first transistor 191. As the charge 201 diminishes, the regulator 103 will gradually turn off, again within a few milliseconds, allowing current to retreat slowly from the card 52.

Finally, the card 52 will be fully withdrawn from the card slot 50 and will enter an end logic state LS6 identical to the start logic state LS0, as shown in FIG. 2. No spikes will have been created at either the card 50 or the mother-board 40.

The present invention has the further advantage of avoiding the effects of pin bouncing, which can contribute to spiking. When pin bouncing occurs at ground contact 111 or at primary contact 112 during insertion or withdrawal, the regulator 103 is off, so no effect will be felt by the load 43. Because the signal controller 102 consumes only a small amount of current itself, any pin bouncing at the ground or primary contacts 111 and 112 will not translate into any significant effects at the mother-board 40. When pin bouncing occurs at the secondary contact 113, first capacitor 181 will dampen the effects, causing any spikes which originate from those bounces to translate into very flattened changes in voltage at both the load 43 and the mother-board 40. In the preferred embodiment contemplated, control signal circuit 104 takes 2 milliseconds to cause the regulator 103 to rise from its low power mode to its high power mode on card insertion, and 1 millisecond to cause the regulator 103 to return to the low power mode on card withdrawal.

Even with an 11 amp current flowing through the load 43, the preferred embodiment reduces voltage overshoot and undershoot spikes to approximately 30 millivolts, compared to the 4 volt spikes which the mother-board 40 typically experiences if a card 52 lacking the power sequencer 100 is inserted or withdrawn.

A further advantage of the power sequencer 100 of the present invention lies in the size of its contact pins 121–123. Normal pins such as the communication pins 106 might be damaged on card insertion or removal due to the initial power-up and power-down currents in the load. However, the contact pins 121–123 are of sufficiently large size to safely handle any such current.

A still further advantage of the power sequencer 100 of the present invention is that its design will prevent harm which might otherwise result to the load 43 from an incomplete insertion of the card 52. Communication pins 106, when used as primary power supply contacts, are susceptible to damage if their power connections are inadequately connected over a long period of time. Considerable voltage chattering will also show up in the mother-board 40 as a result of this partially connected state. Because a card 52 having the power sequencer 100 of the present invention must necessarily be fully powered, by its lengthened contact pins 121–123, before any of its communication sockets 105 touches any communication pins 106, this partially connected state will cause no damage to the card, and no chattering at the mother-board 40.

Finally, other changes are possible within the scope of this invention. For example, although the regulator 103 has been described and shown as a field effect transistor, it is clear that any standard means of voltage regulation may be used in its place. And while the figures show the transistor means 191 and 192 as being n-p-n bipolar transistors, it is clear that many equivalent substitutes may be used in their stead.

Furthermore, while the means of producing the sequence of logic states has been shown to be accomplished by forming the connector means 101 with linearly arranged sockets 131–133, and with pins 121–123 having their ends in non-linearly arrangement due to the differing lengths of the pins 121–123, it is clear that the spatial positioning may be accomplished by other means. For example, all the pins 121–123 could be made of identical length so that the ends of the pins 121–123 are linearly arranged, with the sequencing being accomplished by placing the sockets 131–133 in an appropriate non-linear arrangement on the card 52. It is also possible to reverse the attachment of the parts, and put the pins 121–123 on the card 52 and the sockets 131–133 on the card slot 50.

The present invention has been shown and described with reference to a computer, but it Will be apparent to those skilled in the art that the invention may be practiced in a variety of electronic devices, such as telecommunications systems and others. While the Figures and Detailed Description have disclosed the present invention as one for controlling voltage, it is understood that current and other forms of signals may also be controlled by the present invention.

While the present invention has been shown and described with reference to preferred embodiments thereof, it will be understood by those skilled in the art that these and other changes in form and detail may be made therein without departing from the scope and spirit of the invention.

I claim:

1. A power sequencer for connecting a card to a card slot which is adapted to accept said card and which provides reference, primary and secondary power signals, said card having first and second output terminals for coupling to a load, said power sequencer comprising:

connector means for coupling said card to said card slot, said connector means having reference, primary, and secondary engageable contact means for engaging to apply said reference, primary, and secondary power signals, respectively, said second output terminal being coupled to said reference contact means and said contact means being spatially positioned to create a sequence of logic states such that, on insertion of said card into said card slot, said reference contact means engages and said primary contact means engages before said secondary contact means engages, and on removal of said card from said card slot, said secondary contact means disengages before said primary contact means disengages and before said reference contact means disengages; and controller means, coupled to said connector means, for supplying a terminal signal to said output terminals, said controller means having regulator means for regulating said terminal signal in response to said control signal and control circuit means for generating a control signal which varies in response to said sequence of logic states, said regulator means having source means for accepting a power current, gate means for accepting a variable control current, and drain means for outputting said power current as a function of said control current, said source means being coupled to said primary contact means, and said drain means being coupled to said first terminal; and said control circuit means having, first, second, third, fourth, fifth, sixth, seventh, and eighth resistor means for resisting current, first and second capacitor means for dischargeably storing first and second charges, respectively, first and second transistor means for controllably conducting first and second circuit currents, respectively, each said transistor means having a collector, an emitter, and a base, said first capacitor means being coupled between said gate means of said regulator means and said primary contact means, said first resistor means being coupled between said gate means of said regulator means and said secondary contact means, said second capacitor means being coupled to said primary contact means, said fourth resistor means being coupled between said second capacitor means and said secondary contact means, said seventh resistor means being coupled between said emitter of said first transistor means and said primary contact means, said sixth resistor means being coupled between said collector of said first transistor means and said gate means of said regulator means, said eighth resistor means being coupled between said base of said first transistor means and said primary contact means, said collector of said second transistor means being coupled to said base of said first transistor means, said second resistor means being coupled between said collector of said second resistor means and said reference contact means, said third resistor means being coupled between said reference contact means and said base of said second transistor means, said fifth resistor means being coupled between said primary contact means and said base of said second transistor means, said base of said second transistor means further being coupled to said fourth resistor means and to said fourth resistor means, and said emitter of said second transistor means being coupled to said primary contact means.

* * * * *